March 20, 1928.
F. P. DANNA
STORAGE BATTERY
Original Filed June 4, 1927
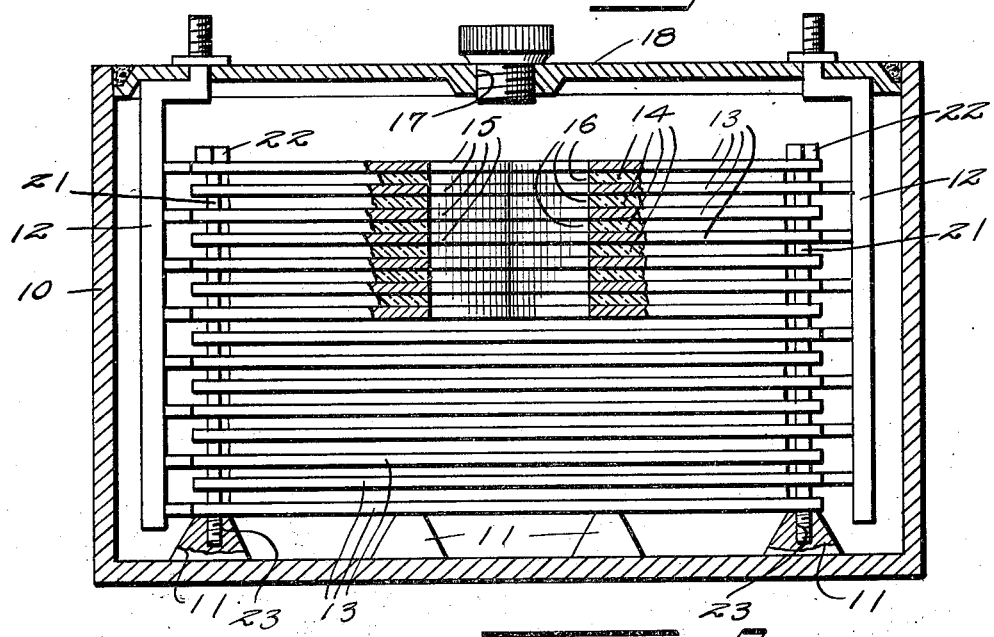
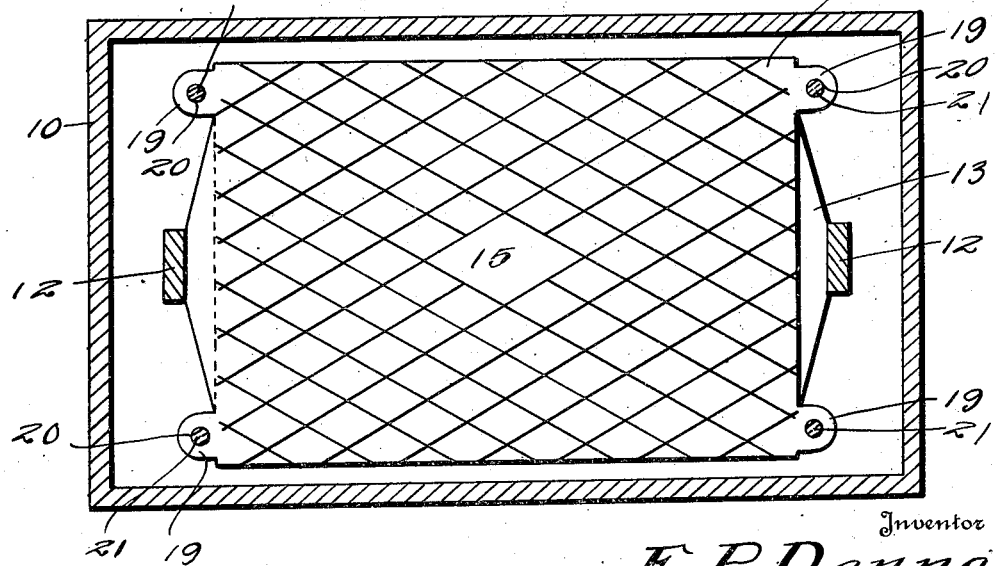
Inventor
F. P. Danna
By Watson E. Coleman
Attorney Patented Mar. 20, 1928.

1,663,193

UNITED STATES PATENT OFFICE.

FRANK PAUL DANNA, OF PLAQUEMINE, LOUISIANA, ASSIGNOR OF ONE-THIRD TO HUBERT J. LAMSON, OF PLAQUEMINE, LOUISIANA.

STORAGE BATTERY.

Continuation of application Serial No. 196,575, filed June 4, 1927. This application filed August 11, 1927. Serial No. 212,306.

This invention relates to storage batteries and more particular to an arrangement and construction of the plates thereof.

An important object of the invention is to provide a construction of this character which will be very sturdy and compact and in which it will be practically impossible to warp, buckle or break the plates.

A further object of the invention is to provide a construction which, in addition to preventing warping and buckling of the plates, firmly holds the plates against movement with relation to the jar, so that the chances of breakage or dislodgment of the assembly is materially decreased.

A further object of the invention is to provide a construction such that loss of active material from the plates and short-circuiting of the battery is prevented.

A still further object of the invention is to improve the structure illustrated in my prior application for patent on storage batteries, Serial No. 196,575, filed June 4, 1927, of which this application is a continuation.

These and other objects I attain by the construction shown in the accompanying drawings, wherein for the purpose of illustration is shown a preferred embodiment of my invention and wherein:—

Figure 1 is a vertical sectional view through a single cell embodying plate units constructed in accordance with my invention;

Figure 2 is a section on the line 2—2 of Figure 1.

Referring now more particularly to the drawings, the numeral 10 designates the jar which may be of any usual or preferred construction and includes the usual transversely extending legs 11 projecting upwardly from its bottom to maintain the plate assembly in spaced relation thereto. Each plate assembly includes a strap 12, which extends vertically instead of horizontally, as in the ordinary storage battery construction and which has burned thereto a series of plates 13, which extend horizontally, the plates of one strap being staggered with relation to the plates of the other strap, so that they may interdigitate to produce the plate assembly. Between adjacent faces of each pair of plates, a separator 14 is arranged. The plates 13 and separators 14 are formed at their centers with openings, designated at 15 and 16 respectively, and these openings vertically underlie a vent opening 17 formed in the cell cap 18 when the battery cell is in assembled relation, so that a central wall is provided through which the electrolyte may circulate or in which a gravity reading may be taken.

The plates 13 may be of any usual or preferred construction, with the exception of the fact that each plate is provided at its opposite ends with spaced ears 19 which are apertured at 20 for the passage of vertically extending insulated rods 21. The rods 21 are provided at their upper ends with polygonal heads 22 permitting application of a wrench thereto and at their lower ends are threaded for engagement in threaded sockets 23 produced in two of the legs 11 which align with the ears 19.

It will be obvious that by providing a compact structure of this character, the loss of material from the plates will be greatly reduced and the probability of short circuits occurring in the battery, due to warping of the plates, will be practically eliminated. Since the threaded rods, in addition to preventing separation of the plates, firmly hold the plate assembly to the battery jar and against either vertical or transverse movement therein, it will be obvious that breakage of the straps or of the jar top, which often results where the usual battery construction is subjected to heavy jolts and vibration, will be eliminated. It will also be obvious that the horizontal disposition of the plates will further assist in increasing the efficiency and life of the battery and aid materially in insuring that the battery is kept in proper condition by the provision of the central well for use in making hydrometer readings.

Since the construction hereinbefore set forth is capable of a certain range of change and modification without materially departing from the spirit of the invention, I do not limit myself to such specific structure except as hereinafter claimed.

I claim:—

1. In a storage battery, a cell, a plate group comprising positive and negative connection straps extending vertically, horizontally disposed plates carried by said straps and interdigitating in the assembled relation thereof, separators between adjacent faces of the plates, said plates having apertures at the corners thereof and insulated rods extended through said apertures threaded at their lower ends for engagement in the cell bottom and at their upper ends having heads for engagement with the uppermost plate and an electrolyte within the cell and surrounding said plates.

2. In a storage battery, a cell containing an electrolyte, a plate group comprising positive and negative connection straps extending vertically, horizontally disposed plates carried by said straps and interdigitating in the assembled relation thereof, separators between adjacent faces of the plates, said plates having apertures at the corners thereof and insulated rods extended through said apertures threaded at their lower ends for engagement in the cell bottom and at their upper ends having heads for engagement with the uppermost plate, a cover for the cell having an aperture and aligning openings formed in said plates and separators and combining to produce a well underlying the aperture of the cap and open at its opposite ends to permit circulation of the electrolyte therethrough.

3. In a storage battery, a cell, a plate group comprising positive and negative connection straps extending vertically, horizontally disposed plates carried by said straps and interdigitating in the assembled relation thereof, separators between adjacent faces of the plates, and means engaging said plate group at each corner of the plates thereof and secured at its lower end to the cell bottom preventing separation of the plates and maintaining the group against vertical or horizontal displacement within the cell.

In testimony whereof I hereunto affix my signature.

FRANK PAUL DANNA.